Nov. 12, 1963    W. G. KNIFFIN, JR    3,110,553
METHOD OF MOLDING PRESTRESSED ELASTOMERIC ARTICLES
Original Filed Oct. 29, 1959    6 Sheets-Sheet 1

INVENTOR.
Walter G. Kniffin, Jr.
BY
His Attorney

Nov. 12, 1963     W. G. KNIFFIN, JR     3,110,553
METHOD OF MOLDING PRESTRESSED ELASTOMERIC ARTICLES
Original Filed Oct. 29, 1959     6 Sheets-Sheet 2

INVENTOR.
Walter G. Kniffin, Jr.
BY
His Attorney

INVENTOR.
Walter G. Kniffin, Jr.
BY
His Attorney

3,110,553
METHOD OF MOLDING PRESTRESSED ELASTOMERIC ARTICLES

Walter G. Kniffin, Jr., Dayton, Ohio, assignor to General Motors Corporation, Detroit, Mich., a corporation of Delaware Original application Oct. 29, 1959, Ser. No. 849,518, now Patent No. 3,007,692, dated Nov. 7, 1961. Divided and this application Dec. 6, 1960, Ser. No. 74,067

7 Claims. (Cl. 18—59)

This invention relates to manufacture of elastomeric articles, and, particularly, to achievement of preloading of elastomeric mounting parts by means of a molding procedure.

This is a division of co-pending parent application S.N. 849,518, filed October 29, 1959, and issued as U.S. Patent No. 3,007,692 on November 7, 1961.

An object of this invention is to provide a new and improved molding procedure whereby there is achieved a prestressing of elastomeric articles of manufacture needed for vibration and shock absorption in support and mounting of members relative to each other.

Another object of this invention is to provide a molding procedure whereby preloading of elastomeric articles of manufacture is accomplished with a minimum number of parts as well as a minimum of time, costs, and material such that separate elastomeric portions are molded under complementary conditions in sequence so as to have the portions exert forces upon each other at all times.

Another object of this invention is to provide a molding procedure including steps of bonding a first quantity of elastomeric material relative to at least one of a pair of members spaced from each other, stressing the first elastomeric material to a distorted condition by movement of the members relative to each other under force such as tension, compression, shear, as well as torsion, maintaining the first elastomeric material under the distorted condition and simultaneously molding a second quantity of elastomeric material in a position continuous with the members as well as the first elastomeric material, and releasing the first elastomeric material from the distorted condition to an equilibrium condition in which the first and second quantities of elastomeric material exert complementary forces in balance relative to each other such that preloading under opposite forces is effected by the first and second quantities of elastomeric material relative to the pair of members.

Another object of this invention is to provide a unitary support assembly including a pair of mounting members, a first resilient means held relative to at least one of the mounting members under a stress that results from force to hold the means relative to the members under tension, compression, shear as well as torsion, and a second resilient means also secured to each of the mounting members under an opposing stress complementary to establish an equilibrium condition of preloading in opposite directions.

Another object of this invention is to provide a molding procedure including steps of providing a pair of mounting members in spaced relation to each other, sequentially molding therebetween multiple resilient portions of separate quantities of elastomeric material that can be soft as well as relatively harder, maintaining force to distort at least one quantity of elastomeric material to a predetermined condition during molding of a subsequent portion, and releasing the maintaining of force to permit attaining of an equilibrium condition of forces of distortion between at least a pair of resilient portions molded between the mounting members.

Further objects and advantages of the present invention will be apparent from the following description, reference being had to the accompanying drawings wherein preferred embodiments of the present invention are clearly shown.

The drawings illustrate steps of a molding procedure that comprehends use of multiple moldings wherein at least one part is subjected to force for stressing such as tension, compression, shear as well as torsion while a further part is molded relative thereto in a condition initially free and unstressed and finally reaching a prestressed condition of equilibrium of force complementary to prestressing of the first part which is released from its distorted condition so as to attempt to return to a free and unstressed condition that it is prevented from attaining due to molding of the further part relative thereto. The basic principles of the present invention are useful for resilient mountings such as provided as engine supports, vehicle suspension bushings for shackles, and the like.

Figure 1A:
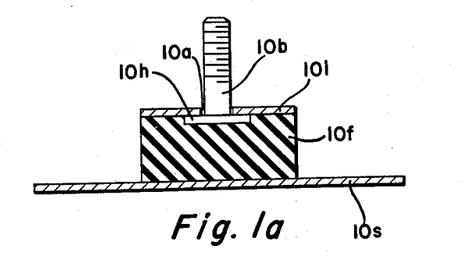
FIGURES 1a, 1b and 1c illustrate features of the present invention for support members and elastomeric portions at least one of which is adapted initially to be stressed under tension and which finally reach an equilibrium condition wherein there is a resulting prestressing of the portions relative to each other and the support members.
Figure 1B:
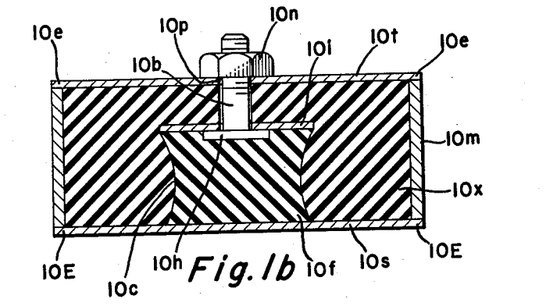
Figure 1C:
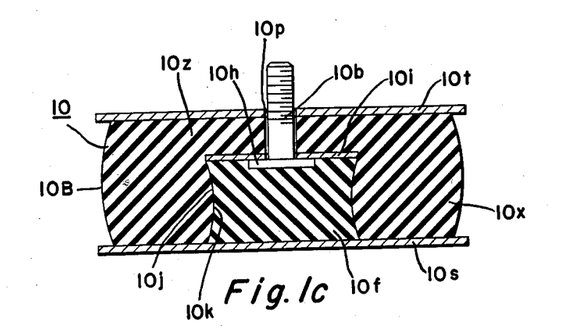

FIGURES 1a, 1b, and 1c illustrate sequentially steps in a molding procedure for accomplishing dual-prestressing of elastomeric means relative to each other and relative to mounting parts therefor. In FIGURE 1a there is shown a side view of a plate-like insert, mounting member, or support means 10s having laterally extending side and edge portions relative to which a suitable opening or bracket can be provided for fastening relative to a frame, chassis, unitized body construction and the like. The shape of the insert or mounting member 10s can be square, rectangular, circular and even any irregular disc-like configuration depending upon the specific requirements for a location relative to which the resilient mounting is to be provided. Also shown in FIGURE 1 is an additional or intermediate plate-like means 10i having a central aperture 10a through which there is fitted a threaded bolt 10b having a head portion 10h at one end on one side of the intermediate means 10i in a location surrounding the aperture 10a. This bolt 10b serves as a force transmitting means relative to the intermediate plate-like means 10i used for effecting a distorted condition upon a first or primary quantity, portion or means 10f of elastomeric material bonded securely along interfaces of the elastomeric portion 10f relative to head portion 10h and one side of the intermediate means 10i and one side or surface of mounting member 10s. The first elastomeric portion 10f is formed to any suitable shape along its radially outer periphery or along lateral outer sides. For example, a square or rectangular box or a cylindrical sleeve may be fitted over the outer or lateral peripheral surface of the first elastomeric portion 10f such that elastomeric material can be injected, molded, and cured in situ in secured and bonded relation to the one surface of the mounting member 10s as well as the head portion 10h and one surface of intermediate means 10i. Next there is the step of providing a further or top insert, mounting member, or support means 10t in spaced relation to the first mounting member 10s as established by a combination spacing and molding means 10m shown in FIGURE 1b. The spacing and molding means 10m can have any suitable shape so as to form a square, rectangular, cylindrical and the like configuration. The spacing and molding means 10m can have a suitable opening through which elastomeric material can be injected in a well known manner. However, in accordance with the present invention, prior to injection of molding or elastomeric material relative to a space or cavity within the confines of the spacing and molding means 10m it is necessary that the first quantity or portion of elastomeric material 10f be stressed to a distorted condition as represented in FIGURE 1b. The top insert or mounting member 10t has a centrally located passage 10p through which the threaded bolt or force transmitting means 10b projects and is adapted to receive a nut or force adjusting means 10n in threaded relationship thereto. Outer edge portion 10e of the top insert or second mounting member 10t is caused to abut against one edge or end of the spacing and molding means 10m that abuts at an opposite end or edge along a peripheral end portion 10E of the first insert or mounting member 10s. Tightening of the nut 10n relative to the mounting member 10t effects distortion, stretching, and tensioning of the first quantity or portion of elastomeric material 10f such that the latter becomes centrally contracted or concave in configuration in a location indicated by numeral 10c. The mounting members 10s and 10t as well as the spacing and molding means 10m must be made of rigid material such as metal that is not readily deformed or bent and that is compatible for bonding relative to resilient or elastomeric material. The nut 10n and threaded body portion 10b of the bolt provide for adjusting of stressing such as tensioning of the first quantity or portion of elastomeric material 10f. The rigidity of the mounting members 10s and 10t as well as of the spacing and molding means 10m make possible a step of maintaining force to distort the first quantity or portion of elastomeric material 10f to permit simultaneous molding of a second quantity or portion 10x of resilient material in a location around or adjacent to the primary quantity or portion 10f. This molding of the secondary portion 10x occurs simultaneously while maintaining stressing such as tensioning of the primary quantity or portion 10f. There is a curing of the secondary portion 10x under conditions illustrated in FIGURE 1b and then the secondary portion 10x is bonded and secured relative to interfaces of mounting members 10s and 10t as well as intermediate means 10i. An inner surface of the spacing and mounting means 10m can be coated with as uitable covering such as tetrafluoroethylene that prevents sticking of elastomeric material relative thereto during curing of the latter. Finally, there is a removing or releasing of stressing such as tension on the primary molding or portion 10f of elastomeric material as illustrated in FIGURE 1c.

During the removing or releasing step illustrated in FIGURE 1c, the first portion 10f of elastomeric material tends or seeks to return to an unstressed condition such as illustrated in FIGURE 1a, but the secondary portion 10x of elastomeric material is bonded in situ relative to the first portion 10f so that the latter can return only part way to its initially unstressed condition. In FIGURE 1c the first portion 10f has been permitted to attain an equilibrium condition still under predetermined tensioning as evidenced by a slightly smaller degree of curvature in a location such as 10k still contracted to a concave configuration now complementary to a laterally inwardly jutting portion 10j. By releasing of maintaining stressing on the primary portion 10f due to removal of nut 10n on the threaded body portion 10b of the bolt, there results a dual preloading of a unitary support assembly generally indicated by numeral 10 in FIGURE 1c such that the primary portion 10f of elastomeric material comes to an equilibrium condition in tension and the secondary portion 10x of elastomeric material comes to equilibrium in compression due to interaction of continuous surfaces along locations 10k and 10j of first and second elastomeric portions respectively. A slight external bulging 10B occurs along a laterally outer periphery of the second elastomeric portion 10x and this is illustrated in a slightly exaggerated state in FIGURE 1c. The primary and secondary molded portions can take a plurality of related shapes to meet specific requirements for control of preloading, hysteresis of elastomeric materials, rate of rebound, spacing between mounting members 10s and 10t, loading such as determined by weight of an engine for example, vibration tuning with respect to shocks to be resiliently absorbed and counteracted, hardness of the first and second portions respectively, balancing of a load such as an engine relative to a chassis or body construction and additional design parameters such as must be met for resilient mountings adapted for use as supports in motor vehicles. In the embodiment of FIGURE 1c the secondary molded portion includes a laterally inwardly extending snubbing or bumper portion 10z that is longitudinally in alignment with one end of the first elastomeric portion 10f and one side of intermediate means 10i at a location laterally outside the body portion 10b of the bolt. In accordance with the present invention, a balance of the physical properties of elastomeric material, primary surface areas, secondary surface areas and degree of preloading or prestressing can effectively produce assembly properties which can be mechanically conditioned and varied to produce any status of dual preloading which cannot be obtained in single moldings. Virtually every characteristic of a resilient mounting, for example, can be varied mechanically during the molding process or procedure in accordance with the present invention.

Figure 2A:
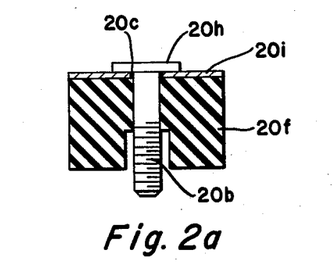
FIGURES 2a, 2b, and 2c as well as FIGURES 3a, 3b, and 3c illustrate features of the present invention for support members and elastomeric portions at least one of which is adapted initially to be stressed under compression and which finally reach an equilibrium condition wherein there is a resulting prestressing of the portions relative to each other and the support members.
Figure 2B:
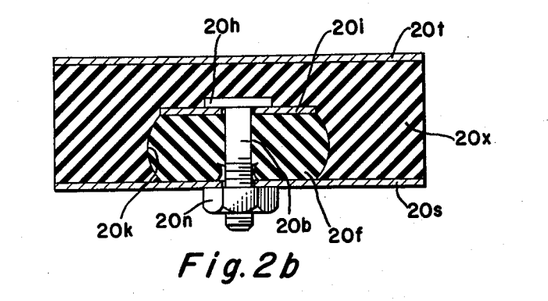
Figure 2C:
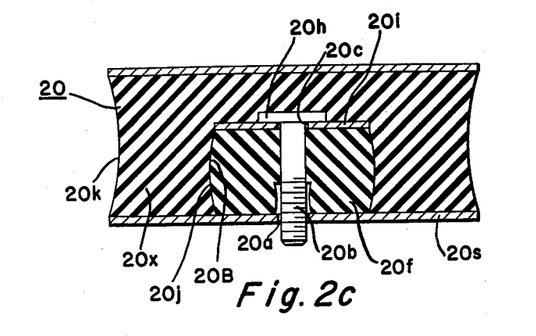
Figure 3A:
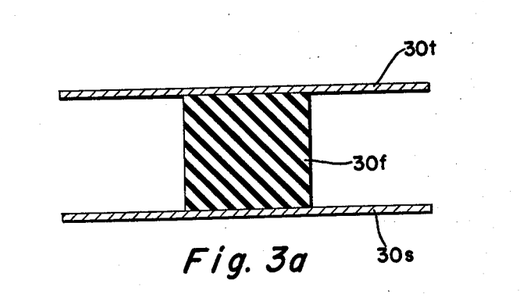
Figure 3B:
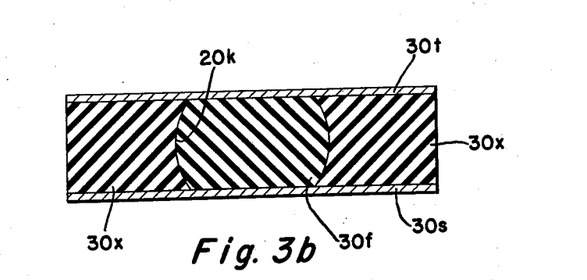
Figure 3C:
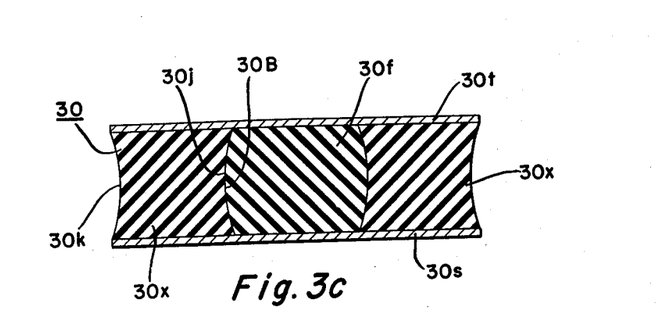

Another example of a molding procedure in accordance with the present invention is provided in FIGURES 2a, 2b and 2c as well as in FIGURES 3a, 3b and 3c wherein prestressing such as compressing of the first or primary portions 20s and 30s respectively occurs. First and second mounting means or members 20s, 20t, 30s and 30t respectively are shown in predetermined spaced relationship to each other. During stressing and compressing of the first quantity or portion of elastomeric materials 20f and 30f illustrated in FIGURES 2b and 3b respectively a secondary quantity or portion of elastomeric material represented by numerals 20x and 30x respectively is molded to be contiguous with the insert or mounting members 20s, 20t, 30s, and 30t, respectively, and releasing of the compression results in attaining of an equilibrium condition as illustrated in FIGURES 2c and 3c respectively. The configuration of the first portions 20f and 30f differs from a configuration illustrated in FIGURE 1c in that the first and second elastomeric portions are now bonded along interfaces relative to mounting members so as to come to an equilibrium condition under which the primary portions 20f and 30f remain in compression while the secondary molded portions come to equilibrium in tension. This condition is evidenced in FIGURES 2c and 3c by complementary relationship of laterally outwardly bulging in a location such as 20B along a surface contiguous with a laterally inner surface of the second portion 20x having a concave or curved configuration 20j and having a contracted outer periphery as represented by reference numeral 20K in FIGURE 2c. Similar bulging is shown in FIGURE 3c in a location represented by reference numeral 30B for the primary portion 30f and reference numerals 30j and 30K for the secondary portion 30x in FIGURE 3c. The insert for mounting member 20s has an aperture 20a through which a threaded end or body portion 20b of a bolt can pass. A head portion 20h of this bolt abuts against an inner portion of intermediate means 20i having a cut-out 20c through which the body portion 20b can pass. Since the stressing for the embodiment of FIGURES 2a and 3a involves compression of the first elastomeric portion 20f molded into any desired shape, it is not necessary that bonding or securing of the first elastomeric portion 20f occurs relative to a pair of spaced plate-like members. As indicated in FIGURE 2a the first elastomeric portion 20f is secured or bonded only relative to a surface on one side of the intermediate means 20i and then a nut 20n shown in FIGURE 2b effects compressing of the first elastomeric portion 20s by tightening of the nut relative to the threaded end of the body portion 20b of the bolt having head portion 20h to pull the intermediate means 20i snugly toward the first mounting member 20s thereby compressing the first elastomeric portion 20f so as to have an excessive bulging portion 20k. Upon removing or releasing of the stressing force by removal of the nut 20n, the first elastomeric portion 20f attains an equilibrium condition as illustrated in FIGURE 2c. A similar equilibrium condition is illustrated in FIGURE 3c in a view of a unitary support assembly generally indicated by numeral 30 and not having the intermediate means such as 20i. The unitary support assembly 30 requires only a minimum number of parts and full compression of the first elastomeric portion 30f can be accomplished by externally pressing together the mounting members 30s and 30t so as to effect bulging at 20k in the first elastomeric portion 30f as illustrated in FIGURE 3b. The first elastomeric portion 30f is molded and cured in situ in an unstressed condition relative to intersurfaces of mounting members 30s and 30t as shown in FIGURE 3a. In FIGURE 3b the elastomeric material of the secondary portion 30x has been molded and cured in contiguous relation with the first elastomeric portion 30f. Stressing and preloading of both first and second elastomeric portions 30f and 30x respectively is illustrated in FIGURE 3c. It is to be understood that where the primary elastomeric portion is used in compression, bonding is not essential but may have advantages. Also, when the primary elastomeric portions is in tension, adhesion of the secondary elastomeric molded portion relative to the first elastomeric portion under predetermined design conditions may not be essential. As a further modification, there can be a coating of interfaces of elastomeric portions with friction reducing materials such as polytetrafluoroethylene, molybdenum sulfide, wax, soap stone, soap, and the like for obtaining control of prestressing and preloading characteristics of the first and second elastomeric portions relative to each other. It is also possible that interfaces of the first and second elastomeric portions can be cut and slit or grooved relative to each other so as to provide intermeshing teeth or surfaces to provide further control of action between interfaces. It is to be understood that for each of the embodiments described thus far, a suitable provision is to be made for mounting of the inserts or support means for use in an environment described and illustrated in a patent, 2,903,208, Everitt, issued September 8, 1959, and belonging to the assignee of the present invention.

Figure 4A:
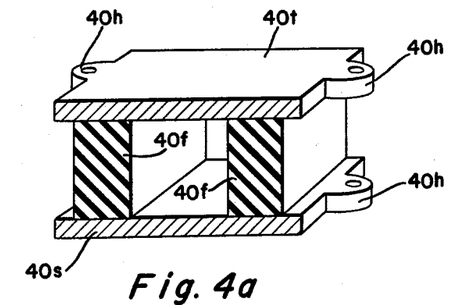
FIGURES 4a, 4b and 4c illustrate in end-sectioned perspective views further features of the present invention for support members and elastomeric portions at least one of which is adapted initially to be stressed under shear and which finally reach an equilibrium condition wherein there is a resulting prestressing of the portions relative to each other and the support members.
Figure 4B:
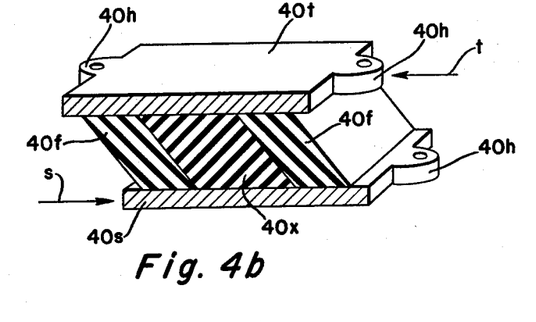
Figure 4C:
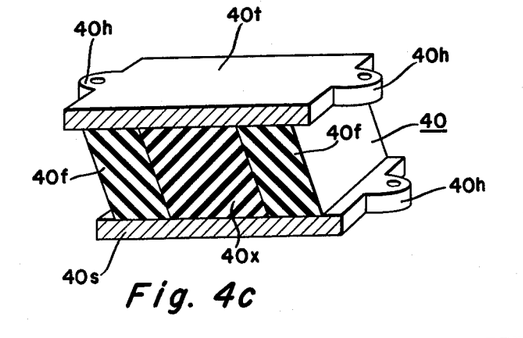

For resilient mountings subjected to lateral deflections, it is possible to provide prestressing of a resilient mounting in accordance with the present invention by a molding procedure illustrated sequentially by the views of FIGURES 4a, 4b, and 4c. Insert means 40s and 40t are provided in predetermined spaced relationship to each other and each having handles or eyelets 40h for engagement by a suitable fastening means such as a hook or bracket (not shown). Initially, the inserts or mounting members 40s and 40t are in substantially parallel alignment in locations laterally adjacent to each other and a first elastomeric portion 40s is molded and cured in situ in secured and bonded relationship with opposite surfaces of the inserts or mounting members 40s and 40t. Then while maintaining a stressed condition such as shear as illustrated in FIGURE 4b, the first quantities or portions 40f of elastomeric material are distorted due to movement of mounting members 40s and 40t longitudinally relative to each other in the directions of arrows s and t, respectively, there is a step of simultaneously molding a secondary elastomeric quantity of portion 40x in a location in between or to one side of the first quantity or portion 40f of elastomeric material. It is to be understood that at least one section or portion of the first and second quantities of elastomeric materials must be provided. FIGURE 4c illustrates the unitary support assembly now generally indicated by numeral 40 and including the mounting members 40s and 40t on opposite sides of first and second elastomeric portions in an equilibrium condition of stressing wherein the first portion of elastomeric material 40x is resiliently hindered from returning to an initially free and unstressed condition of FIGURE 4a because of the provision of additional or secondary resilient portion 40x. Shots or quantities of elastomeric materials can be injected or supplied sequentially with an initially molded portion such as 40f in shear and the elastomeric portions can have any desired shape and configuration as required by a particular resilient mounting.

Figure 5A:
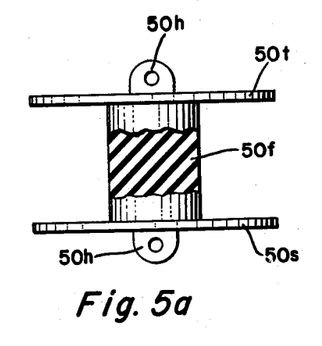
FIGURES 5a, 5b, and 5c illustrate in perspective partially-sectioned side views features of the present invention for support members and elastomeric portions at least one of which is adapted initially to be stressed in torsion or twisting and which finally reach an equilibrium condition wherein there is a resulting prestressing of the portions relative to each other and support members.
Figure 5B:
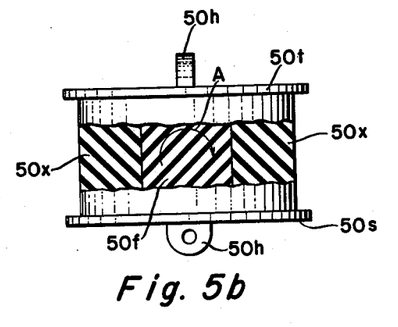
Figure 5C:
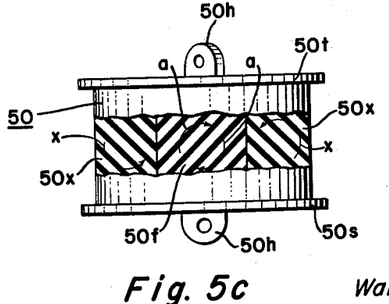

FIGURES 5a, 5b and 5c further illustrate a molding procedure and unitary support assembly in accordance with the present invention. A pair of annular discs or plate-like mounting or support members 50s and 50t each having eyelets such as hook members or fastening portions 50h are provided in substantially parallel relation to each other and spaced a predetermined distance laterally away from each other. A first elastomeric portion 50f is molded so as to be bonded and secured in situ relative to surfaces of the plate-like members 50s and 50t as shown in FIGURE 5a and then one mounting member such as 50t is twisted or stressed torsionally by turning in clockwise direction, for example, as represented by arrow A so as to bring the handle or hook means 50h of member 50t into a position transverse with respect to a position of handle or member 50h of the other mounting member 50s. This transverse relationship of the hook member or means is used to illustrate conveniently the turning or twisting of the first elastomeric portion 50f into a distorted condition as represented by the view of FIGURE 5b. While maintaining this distorted condition, a second elastomeric portion 50x is molded in situ laterally on at least one side of the first elastomeric portion 50s. FIGURE 5c represents a unitary support assembly generally indicated by numeral 50 in which first and second elastomeric portions 50x and 50s are contiguous and bonded or secured relative to each other as well as relative to the mounting members 50s and 50t. The first and second elastomeric portions as illustrated in FIGURE 5c are in an equilibrium condition in which the second elastomeric portion 50x hinders return of the first elastomeric portion 50f to a free and unstressed condition. Small arrows represented by a reference a indicate torsional force balanced by force represented by small arrows x in secondary elastomeric portions 50x.

The angular position of hook means 50h on mounting member 50t relative to the flush side view of the hook means 50h of member 50s represents further the equilibrium condition whereby there is a dual preloading and prestressing of first and second elastomeric portions of the unitary support assembly 50 made in accordance with the molding procedure of the present invention.

Figure 6:
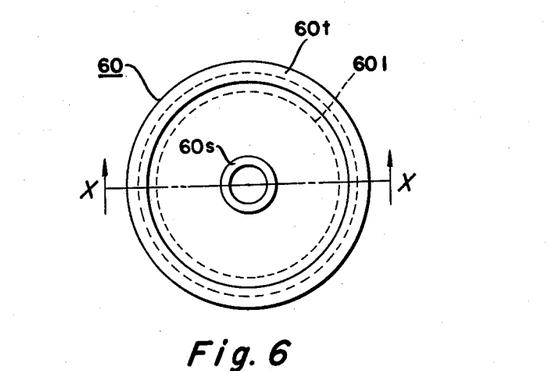
FIGURE 6 is an end view of support members and elastomeric means further modified in accordance with cross-sectional views of FIGURES 6a and 6b both taken along line x—x in FIGURE 6 and both representing support members and elastomeric portions at least one of which is adapted initially to be stressed in torsion or twisting prior to obtaining an equilibrium condition wherein there is a resulting preloading of the portions torsionally as well as in possible shear relative to each other and the support members.
Figure 6A:
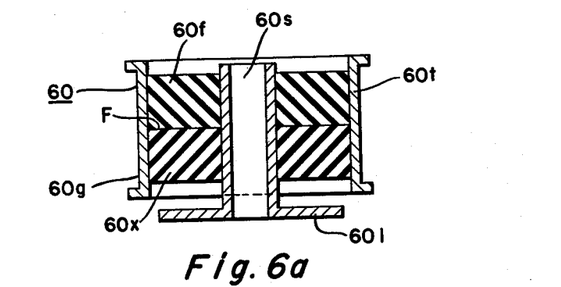

FIGURE 6 illustrates a further modification of a resilient mounting in accordance with the present invention and involving torsional preloading of first and second elastomeric portions relative to each other. FIGURE 6 shows an end view of an inner tubular mounting member 60s having a laterally extending portion 60L and concentrically spaced in a predetermined location relative to an outer mounting member or tube 60t having peened over ends forming a groove or channel 60g visible in FIGURES 6a and 6b such that an eyelet or ring end of a suspension arm can be mounted and resiliently supported by first and second elastomeric portions relative to the central mounting member or sleeve 60s that can be suitably carried or keyed relative to a shaft. The suspension arm and shaft can be resiliently shackled as is commonly done in suspension systems of motor vehicles. The view of FIGURE 6a illustrates a first elastomeric portion torsionally distorted during molding of a second elastomeric portion molded simultaneously relative thereto while maintaining the first elastomeric portion in fully distorted condition. FIGURE 6a illustrates a bushing support assembly generally indicated by numeral 60 and including the first elastomeric portion 60s and a second elastomeric portion 60x in equilibrium condition relative to each other. In the event the first and second elastomeric portions are bonded and secured to each other along an inter-face F there is an additional preloading force in shear between these first and second portions relative to each other once the stressing condition is released relative to the first elastomeric portions while simultaneously molding the second elastomeric portion 60x in situ relative to the inner and outer support members 60s and 60t respectively.

Figure 6B:
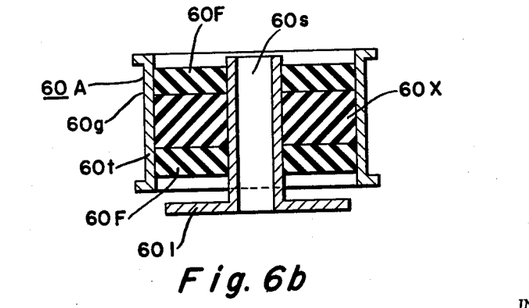

A further modification in the bushing assembly is shown in FIGURE 6b wherein there is a unitary support assembly generally indicated by numeral 60A including individual sections 60F of the first elastomeric portions stressed in torsion by turning of the outer support member 60t relative to inner support member 60s and then maintaining the first elastomeric portion in distorted condition while simultaneously molding and bonding a second elastomeric portion 60X relative thereto. The illustration of FIGURE 6b represents the equilibrium condition of the first and second annular elastomeric portions relative to each other as made in a molding procedure in accordance with the present invention.

The laterally extending portion 60L of the inner mounting member 60s is optional and it is also apparent that both the inner and outer members can be cylindrical members concentrically spaced relative to each other and resiliently joined by dual prestressed portions in accordance with the present invention. It is also possible that the inner and outer mounting members can be rectangular or square in cross section rather than cylindrical. In any event, molding apparatus and a method of molding elastomeric material relative to such concentric members can be accomplished in accordance with a disclosure of Patent 2,845,657, Beare, issued August 5, 1958, and belonging to the assignee of the present invention. The structures of FIGURES 6a and 6b are suitable for shackle mountings involving resilient bushings to attain predetermined preloading and prestressing in opposite directions. It is also to be understood that first and second elastomeric portions in any of the embodiments can be made of similar or dissimilar resilient materials having differing characteristics such as relatively greater resilience and softness and the like. Well known resilient or plastic materials such as natural rubber, butadiene-styrene copolymers, butadiene-acrylonitrile copolymers, reclaimed rubber, or compatible mixtures thereof and the like can be used for molding materials adapted to be cured in a suitable manner.

While the embodiments of the present invention as herein disclosed constitute preferred forms, it is to be understood that other forms might be adopted.

What is claimed is as follows:

1. In a multiple molding and direct dual-prestressing procedure for making resilient mountings including a pair of rigid mounting members spaced a predetermined distance from each other and joined at least in part by necessarily multiple though contiguous elastomeric material therebetween, the combination therewith which comprises steps of bonding a first quantity of elastomeric material resilient per se in fully unstressed condition directly relative to at least one of the pair of rigid members, stressing the first elastomeric material to an extreme distorted condition by movement of at least one of the rigid members relative to the other, maintaining the first elastomeric material in the extreme distorted condition under force such as tension, compression, shear as well as torsion and simultaneously molding a second quantity of elastomeric material resilient per se also initially in fully unstressed condition in a position directly contiguous with the rigid mounting members as well as the first elastomeric material still subject to said stressing, instantaneously releasing the first elastomeric material from the extreme distorted condition to an equilibrium condition in which both the first and second quantities of elastomeric material coact in a direct interchange of forces of resilience per se and exert complementary forces in balance relative to each other, said releasing simultaneously progressing into a step of dual prestressing in each of the quantities of elastomeric material resilient per se to oppose complete return to unstressed condition, said dual prestressing under opposite forces occurring due to direct contiguous relationship of the first and second quantities of elastomeric material between the pair of rigid mounting members forming a composite unitary mounting in which first and second quantities of elastomeric material both retain resilience per se subject to said dual-prestressing therebetween.

2. In a sequential direct molding and dual-prestressing procedure for making resilient mountings including a pair of rigid mounting members spaced a predetermined distance from each other and joined at least in part by necessarily multiple though contiguous elastomeric material therebetween, the steps comprising bonding a first resilient quantity of stress-free elastomeric material directly relative to at least one of the pair of rigid members, placing the first elastomeric material resilient per se under tension in an over-distorted condition, maintaining the first elastomeric material in the overdistorted condition and simultaneously molding a second resilient quantity of stress-free elastomeric material in a position directly contiguous with the rigid mounting members as well as the first elastomeric material, instantaneously releasing the first resilient quantity of elastomeric material from the overdistorted condition and simultaneously finally dual-prestressing directly into an equilibrium condition in which the first and second resilient quantities both coact directly with each other resiliently to maintain the equilibrium condition and to oppose complete return to unstressed condition for both the first and second resilient quantities of elastomeric material directly contiguous with each other.

3. In a multiple molding and dual-prestressing procedure for making resilient mountings including a pair of rigid mounting members spaced a predetermined distance from each other and joined at least in part by elastomeric material therebetween, the steps comprising bonding a first resilient portion of elastomeric material in fully unstressed condition directly relative to at least one of the pair of rigid members, compressing the first resilient portion into an overdistorted condition with outward bulging thereof, maintaining the first resilient portion in overdistorted outward-bulging condition and simultaneously molding a resilient portion of fully unstressed elastomeric material in a position directly contiguous with the rigid members as well as the first resilient portion, instantaneously releasing the first resilient portion from said compressing and simultaneously dual-prestressing said elastomeric material into a predetermined equilibrium condition in which the first and second portions both coact resiliently with each other to maintain the equilibrium condition and to oppose complete return to bulge-free and unstressed condition of either resilient portion.

4. In a sequential molding and dual-prestressing procedure for making resilient mountings including a pair of rigid mounting members spaced a predetermined distance from each other and joined at least in part by elastomeric material therebetween, in combination therewith an improvement for effecting a desirable unitary end result comprising, bonding a first resilient portion of elastomeric material in totally unstressed condition relative to the pair of rigid mounting members, forcing the material under shear to an exaggerated distorted condition attained by lateral movement of the rigid mounting members relative to each other, maintaining the first resilient portion of elastomeric material under shear in distorted condition and simultaneously molding a second resilient portion of totally unstressed elastomeric material contiguous with the members as well as the first resilient portion, instantaneously releasing the first resilient portion from said forcing under shear and simultaneously dual-prestressing into a predetermined equilibrium condition in which both the first and second resilient portions coact and remain partially distorted though fully in complement with each other such that prestressing occurs and results in both resilient portions to oppose return to totally unstressed condition of either resilient portion.

5. In a molding and dual-prestressing procedure for making resilient mountings including a pair of rigid mounting members spaced a predetermined distance from each other and joined at least in part by elastomeric material therebetween, the steps, comprising, bonding a first resilient portion of elastomeric material in unstressed condition relative to the pair of rigid members, twisting as well as maintaining only the first resilient portion in distorted condition under torsional force and simultaneously molding a second resilient portion of elastomeric material in a position contiguous with the rigid members as well as the first resilient portion, instantaneously releasing the first resilient portion from said twisting and simultaneously dual-prestressing to a predetermined equilibrium condition in which both the first and second resilient portions remain torsionally prestressed to oppose return to unstressed condition of each resilient portion.

6. The procedure of claim 5 wherein there is an additional step of bonding the second resilient portion of elastomeric material directly to the first resilient portion of elastomeric material while the latter is subjected to said twisting, said releasing then effecting further prestressing both torsionally as well as in shear between the first and second resilient portions.

7. In a method of molding and direct dual-prestressing resilient mountings such as provided as engine supports, vehicle suspension bushings for shackles and the like having at least a pair of rigid mounting members in predetermined spaced relation to each other, the improvement which comprise sequentially molding therebetween multiple resilient portions of separate quantities of elastomeric material purposely distorted to be positioned in directly contiguous relation to each other, and purposely dual-prestressing adjoining contiguous resilient portions under opposing force conditions having necessarily one of the portions bulging laterally to complement remaining elastomeric material in an equilibrium situation in which the resilient portions are coacting directly with each other and remain partially distorted though both resilient always to oppose return to totally unstressed condition of an individual resilient portion, further dual-prestressing for lateral bulging occurring between confines of the pair of rigid mounting members between which vibrations are thus damped collectively subject to said dual-prestressing to return to the equilibrium situation maintained by the elastomeric material which is molded in sequentially finished resilient portions so as to be bonded and secured in situ as a composite unitary mounting in which first and second quantities of elastomeric material both retain resilience per se subject to said dual-prestressing therebetween relative to the pair of rigid mounting members as well as in contiguous engagement of resilient portions with each other.

References Cited in the file of this patent

UNITED STATES PATENTS

| | | |
|---|---|---|
| 1,820,750 | Lord | Aug. 25, 1931 |
| 1,912,807 | Venosta | June 6, 1933 |
| 2,144,848 | Miller | Jan. 24, 1939 |
| 2,382,372 | Wallerstein | Aug. 14, 1945 |
| 2,549,144 | Truscott | Apr. 17, 1951 |
| 2,666,954 | Potter | Jan. 26, 1954 |

FOREIGN PATENTS

| | | |
|---|---|---|
| 668,987 | Germany | Dec. 14, 1938 |